United States Patent [19]

Benjamin et al.

[11] 4,260,591

[45] Apr. 7, 1981

[54] PROCESS FOR PREPARING ALKALI METAL ALUMINUM PHOSPHATE

[75] Inventors: Robert E. Benjamin; Thomas E. Edging, both of Nashville, Tenn.

[73] Assignee: Stauffer Chemical Company, Westport, Conn.

[21] Appl. No.: 972,097

[22] Filed: Dec. 21, 1978

[51] Int. Cl.³ .............................................. C01B 25/30
[52] U.S. Cl. .................................. 423/267; 423/274; 423/306; 426/498; 426/563
[58] Field of Search ............... 426/563, 498; 423/306, 423/267, 274

[56] References Cited

U.S. PATENT DOCUMENTS

| | | | |
|---|---|---|---|
| 2,793,121 | 5/1957 | Novitsky | 426/563 |
| 3,736,151 | 5/1973 | Post et al. | 426/563 |
| 4,196,226 | 4/1980 | Benjamin et al. | 423/306 |

FOREIGN PATENT DOCUMENTS

| | | | |
|---|---|---|---|
| 236379 | 10/1961 | Australia | 106/110 |
| 734857 | 5/1966 | Canada | 423/306 |

*Primary Examiner*—O. R. Vertiz
*Assistant Examiner*—Wayne A. Langel
*Attorney, Agent, or Firm*—Paul J. Juettner

[57] ABSTRACT

The addition of calcium sulfate to an alkali metal aluminum phosphate slurry prior to drying provides an improved process which results in a cleaner reactor, easier drying and granulation, increased production rates, a decreased mill heat requirement and a product having an increased density which is less dusty allowing for easier handling, and substantially non-hygroscopic which avoids caking and blinding of classifier screens.

17 Claims, No Drawings

PROCESS FOR PREPARING ALKALI METAL ALUMINUM PHOSPHATE

BACKGROUND OF THE INVENTION

1. Field of the Present Invention

The present invention relates to an improved process for preparing alkali metal aluminum phosphate granules useful as a leavening acid which provides for a cleaner reactor, easier granulation and drying, increased production rates and a decreased heating requirement in the milling stage while providing a product of increased density, lower dustiness and which is substantially non-hygroscopic.

2. Prior Art

Crystalline sodium aluminum phosphate (or SALP) was first disclosed in U.S. Pat. No. 2,550,490 and an early baking powder composition incorporating SALP was disclosed in U.S. Pat. No. 2,550,491. U.S. Pat. No. 2,550,490 specifically discloses a SALP with a Na:Al:PO4 ratio of 1:3:8. Since that time, several modifications of sodim aluminum phosphate have been developed which give different reactivities and performance characteristics. These include a dehydrated SALP, U.S. Pat. No. 2,957,750; a 3:3:8 SALP, U.S. Pat. No. 3,223,479; a 3:2:8 SALP; U.S. Pat. No. 3,501,314, a 2:3:6 SALP; U.S. Pat. No. 3,574,536, an amorphous SALP; U.S. Pat. No. 2,995,421, a 3:3:9 SALP; U.S. Pat. No. 3,726,962 and the continuous crystallization of SALP, U.S. Pat. No. 3,311,448.

Sodium aluminum phosphate is a well known leavening agent in the baking industry. It finds use in baking powders, self-rising mixes, preleavened pancake flours and mixes, prepared biscuit mixes, and prepared cake mixes (see U.S. Pat. Nos. 2,550,491, 3,109,738, 3,041,177, 3,076,178). It is also used as a meat binding agent. Sodium aluminum phosphate, basic, is useful as a melt controlling additive in cheese.

Sodium aluminum phosphate has several inherent deficiencies, the most serious of which is dusting and hygroscopicity. Sodium aluminum phosphate dust is very light and rapidly permeates the air in food processing plants, creating cleaning and sanitation problems and unsatisfactory working conditions for the employees. Additionally, the finely divided particles of sodium aluminum phosphate do not flow easily.

Sodium aluminum phosphate is also an inherently hygroscopic material which will absorb a large quantity of atmospheric moisture, usually about 28-29% by weight. Originally produced, SALP is a dry, white crystalline product. If permitted to stand exposed in a hot, humid atmosphere, it rapidly absorbs moisture, first forming water droplets or caking at the surface, then becoming what may be termed as a viscous semi-fluid. Commercially, this phenomenon is minimized somewhat by the use of sealed, air-tight containers.

Several proposals have been made in the past for improving the physical handling properties of sodim aluminum phosphate, particularly directed to improving flow characteristics and dust properties. These approaches have generally been directed to agglomerating or pelletizing the SALP as disclosed, for example, in U.S. Pat. No. 3,620,972 which utilizes water as an agglomerating medium. Other methods have involved the employment of various binders such as sugars and crystallizing syrups. Still other approaches utilize the addition of small amounts of colloidal $SiO_2$ or tricalcium phosphate to the SALP as flow conditioners to improve physical handling properties.

In connection with SALP 3:2:8 disclosed in U.S. Pat. No. 3,501,314, it is known to dry blend a flow conditioner with dry SALP crystals. The flow conditioner can be any alkali or alkaline earth metal phosphate, calcium hydroxide or aluminum oxide. It is taught that the dry flow conditioner particles are adhered to dry SALP particles as a dry coating. The flow conditioners are taught to increase flowability and reduce hygroscopicity. However, flow conditioners in general are known to only improve handling characteristics to a slight degree.

U.S. Pat. No. 3,255,073 to Blanch et al describes a potassium modified sodium aluminum acid phosphate having decreased hygroscopicity. This result is accomplished by modifying the original sodium aluminum phosphate molecule with the introduction of potassium. The potassium is explained as replacing hydrogen atoms in the crystalline lattice of sodium aluminum phosphate. This improved potassium modified sodium aluminum phosphate is described as having hygropscopic properties wherein it does not increase in weight by more than about 20%, preferably not more than about 10% of its original weight during continued exposure at 35° C. and 75% relative humidity for 140 hours.

An improvement over U.S. Pat. No. 3,205,073 is U.S. Pat. No. 3,411,872 to Post et al which attempts to improve the flow characteristics of Blanch et al's potassium modified sodium aluminum phosphate by incorporating the potassium ions in a solvent suspension of an alkanol.

A further improvement over U.S. Pat. No. 3,205,773 is disclosed in U.S. Patent application No. 671,769, filed Mar. 30, 1976 by R. Benjamin et al. In that application, a specific ratio of sodium and potassium is used to prepare potassium modified SALP. The improved SALP product is characterized by increased density and reduced dusting properties. Among the advantages accrued thereby are ease of packaging, use of smaller bags that palletize more easily, decreased hygroscopicity and improved flow characteristics. All of these properties enable better handling, in general, especially under conditions of high humidity.

It is taught in U.S. Pat. No. 2,550,490 that the speed of the gas developing reaction of the sodium aluminum phosphate can be accelerated by the use of an accelerator such as monocalcium phosphate. The monocalcium phosphate may be formed on the surface of the sodium aluminum phosphate crystals by preparing the SALP as usual but omitting an alcohol wash to remove excess phosphoric acid and neutralizing the excess phosphoric acid with hydrated lime. After vigorous agitation, the mixture solidified into small granular lumps. After drying, it was required that the product be milled to provide a dry, non-hydroscopic powder having a neutralizing value of 100.4 and a particle size sufficiently small to be usable in baking. It was tested in the baking of biscuits and found to have baking characteristics equal to that of standard commercial phosphate-alum baking powders.

It has also been found that a calcium treated sodium aluminum phosphate having improved handling characteristics can be prepared by contacting a slurry of sodium aluminum phosphate having an excess of phosphoric acid with a calcium compound reactable with the acid followed by granulating the calcium treated product while drying under such conditions that a majority of the granulated particles are less than 840 micron(through 20 mesh) and at least 90% less than 2000 micron (U.S. application Ser. No. 899,445 which is a continuation U.S. application Ser. No. 703,872, now abandoned). The entire disclosures of these applications (Ser. Nos. 671,769, 703,872, and 899,455) and hereby incorporated by reference. There is provided granulated complex aluminum phosphate granules with a calcium rich, theoretically, a calcium phosphate, outer surface. This process can also be included as part of the process for preparing potassium, modified SALP such as described in U.S. application Ser. No. 671,769 above. Since this process requires a reaction between phosphoric acid and a reactive calcium compound such as calcium hydroxide, the stoichiometry of the reaction must be such that an excess of phosphoric acid is provided for. Further, the product contains calcium phosphate which might not be desirable at all times. Also, the product must be granulated while drying. Any beneficial effect is lost if the product is extensively ground.

Various unsuccessful attempts have been made to dry blend sodium aluminum phosphate and calcium sulfate. The dry blended composition tended to cake and blind sifting screens in the processing equipment of the user.

BRIEF DESCRIPTION OF THE INVENTION

In accordance with the present invention, it has been found that sodium aluminum phosphate having improved handling characteristics and useful as a leavening agent can be prepared by a process which comprises contacting a slurry of a complex alkali metal aluminum phosphate with calcium sulfate prior to drying, the drying preferably being accomplished by granulating the calcium treated product while drying under such conditions that a majority of the granulated particles are less than 840 micron (through 20 mesh) and at least 90% less than 2000 micron. The slurry prior to calcium sulfate addition contains less than 1% free acid. It is theorized that there is provided granulated complex sodium aluminum phosphate granulates combined with calcium sulfate, possibly as a coating thereon. The process of the present invention can also be included as part of the process for preparing potassium-modified SALP.

The process of the present invention has significant advantages in providing a product which granulates easily and drys rapidly; as discussed hereinafter a longer drying zone (wet zone) in the dryer/granulator is possible thus increasing production rate and less heat is required to dry the product during milling again lowering energy consumption. The product does not blind screens during screen analysis. The process of the invention also has provided a cleaner reactor which can be a significant factor in the economics of the process.

The foregoing benefits are provided without the need of any adjustment in the formulation of the original SALP. Surprisingly, no chemical reaction is necessary to accomplish the results of the present invention since calcium sulfate is substantially inert to reaction in the system. Control of reaction other than that normally used for preparing the SALP is not needed.

The products of the present invention are less dusty and evidence a greater density than a comparable SALP prepared without calcium sulfate and untreated SALP. The products of the present invention are easier to handle, and bag in smaller bags because of the increased density and decreased dusting. Smaller bags can be stacked on smaller pallets and are easier to load for shipment. The product is dry and free flowing, does not bind screens, and can be used in most types of manufacturing and formulating equipment including air conveyors.

DETAILED DESCRIPTION OF THE PRESENT INVENTION

Alkali metal aluminum phosphates are well known compounds which have been defined in numerous patents such as U.S. Pat. Nos. 3,109,738 and 3,501,314, the disclosures of which are incorporated by reference herein. The alkali metal aluminum phosphates are acidic and contain alkali metal, aluminum, hydrogen, oxygen and phosphorus in such proportions to correspond, on a molar basis and disregarding any water of hydration, to from about 46% to about 80% $H_3PO_4$, about 14% to about 47% $AlPO_4$ and about 3 to about 22% alkali metal phosphate; preferably, from about 50% to about 70%, about 20% to about 40% and about 3% to about 16%; and most preferably from about 55% to about 65%, about 23% to 40% and about 3% to 14% respectively with the total for any one complex being 100%±10. Alternatively, a preferred group of complex alkali metal aluminum phosphates can be defined by the formula:

$$M_aAl_bH_c(PO_4)_{7-10}\cdot 0-8H_2O$$

wherein M is an alkali metal of sodium or potassium, an ammonium ion or mixtures thereof. Ammonium is generally included within the class of alkali metals because of its similar chemical properties. The letters (a), (b), (c), are numbers representing the various numerical ratios possible in preparing alkali metal aluminum phosphates and fall within the ranges from about 1 to about 5 for a; about 2 to about 4 for b; and about 11 to about 17 for c with the sums of a+3 b+c equal to the sum of the valencies of the phosphate ($PO_4\equiv$) radicals, i.e. between 21 and 30. These numbers can be integers or fractions thereof. The quantity of water of hydration present can range from 0 upward. Representative ratios are shown in the discussion of the background of the invention. It is intended that this application cover only those ratios which will form an alkali metal aluminum phosphate. At present, two SALP's are commercially available as leavening acids, i.e., 1:3:8 and 3:2:8 and these are intended to be covered specifically.

SALP compounds are traditionally prepared by mixing an alkali metal hydroxide or carbonate such as sodium carbonate, sodium hydroxide, potassium carbonate, potassium hydroxide, ammonium carbonate, ammonium hydroxide or mixtures thereof, with phosphoric acid having a strength of about 70-90% acid, preferably, about 85-88% and more preferably about 86-87% acid in an amount sufficient to provide the ratio of alkali metal to $PO_4$ which is desired. The selection of these ratios can be easily ascertained by one skilled in the art. The temperature during this mixture period is generally maintained above 40° C. and below 100° C. This material is then treated with an aluminum compound such as aluminum trihyrate. The aluminum compound is generally added incrementally. The temperature during aluminum addition can rise to about 140° C. and then drop to about 110° C.

At this point, the reaction product is usually cooled to about 60°-75° C. for about 15-30 minutes to form a slurry of crystalline alkali metal aluminum phosphate. The slurry is then directed to a Kneadermaster kneader conveyor blender (dryer/granulator) where the product is dried and granulated simultaneously. It is preferred that the slurry contain less than 1% and more preferably less than 0.5% free acid by weight based on the weight of the dried product. The proportion of reactants can be selected to provide this result.

The Kneadermaster mixer or blender comprises a jacketed vessel having an operation pressure of about 80-120 psig of steam. Hot air is fed into the central portion of the vessel. The slurry of reaction product traverses the length of the Kneadermaster dryer/granulator, moved along by rotating blades. A particular length of the Kneadermaster is designated as the "wet zone" and is indicative of the distance the slurry traverses in the Kneadermaster before become substantially particulate and dry in appearance. Some processes utilize a "short wet zone" or a "regular wet zone". In general, the length of the wet zone can be varied and is determined by the loss on ignition (LOI) of the final product. LOI is a measurement of the percent weight loss of a 2 gram sample of the product when ignited in a muffle furnace at a temperature of about 750°-850° C. preferably 800° C. for a period of about 10 minutes. Variation in LOI can vary the rate of gas release of the product in a leavening system. LOI's can be varied to provide different rates for different leavening and systems. While the product can be totally dried in the Kneadermaster, it may be more convenient to finally dry the product in a heated mill.

The calcium sulfate treated alkali metal aluminum phosphate of the present invention can be prepared using any known acid soluble alkali metal aluminum phosphate material, the preferred materials being 1:3:8 and 3:2:8 SALP and more preferably 1:3:8 SALP.

For ease of description, the remaining description will relate to SALP (sodium aluminum phosphate) 1:3:8 though it is understood that this description applies to all aluminum phosphates generically encompassed by the invention unless otherwise stated.

After the initial formation of SALP in the reactor which is in the form of a slurry and prior to the initial drying in the Kneadermaster dryer/granulator or by reslurrying dried SALP crystals, the SALP slurry is added to or has added to it calcium sulfate in an amount ranging from about 0.5% to about 20% and preferably from about 1% to about 10%, the percentage being by weight based on the combined dry solids weight of the SALP and the calcium sulfate.

The preferred form of calcium sulfate used in the present invention is the anhydrous.

It is preferred to add the calcium sulfate to the SALP slurry to prevent dusting losses. Addition is made incrementally with agitation at a temperature of 80°-100° C. The calcium sulfate can be added with equal effectiveness at any time after the initial formation of SALP and before drying. It is preferred that the SALP slurry be cooled prior to calcium sulfate addition. It may be necessary to add some free water or other solvent to maintain viscosity of the slurry. The viscosity of the slurry is maintained by controlling the loss on ignition. The loss on ignition (LOI) should be maintained within the range of from about 29% to about 34%, preferably from about 30% to about 32% and more preferably from about 30% to about 31%.

The calcium sulfate treated SALP is then granulated while drying the product under such conditions that a majority of the particles are less than 840 microns (20 mesh) and 90% are less than 2000 micron (10 mesh). By majority is meant at least 50%, and preferably at least 60%. Less than 10% of the product as prepared is larger than 2000 microns. It is preferred to attain as much proper granulation as possible in the drying step since any particles greater than about 60 mesh must be milled in order to obtain a product having a working particle size distribution of less than about 60 mesh.

Depending on the length of the wet zone and the particle size of the product, the material leaving the Kneadermaster can be fully or partially dried. In prior methods of preparing SALP, the product can leave the Kneadermaster with as much as 2% excess moisture (LOI). Some is lost by evaporation and the remainder is driven off by milling the product in a mill heated to a temperature between 300° C. and 400° C. After milling, the product is classified by particle size and those particles larger than about 60 mesh are returned to the mill for regrinding. Particles sufficiently dry do not require further drying (LOI 19-21%) and of desirable size can be separated before milling if desired.

The temperature within the mill is maintained sufficiently hot to drive off the excess moisture, usually reducing the LOI by up to 2%. Without the calcium sulfate, the LOI's are generally reduced from a range of from about 21% to about 23% and preferably from about 22%±0.5% to from about 19% to about 21% and preferably about 20%±0.5%. These figures must be adjusted for the amount of $SO_3$ from the calcium sulfate lost in ignition. As the amount of calcium sulfate is increased, the temperature needed for drying in the mill can be reduced. At approximately 1-2% calcium sulfate, a temperature of from 250° C. to 300° C. has been found preferable. At higher levels of calcium sulfate, the temperature can be reduced. At amounts of 7-10%, calcium sulfate the temperature can be reduced as low as from about 90° C. to about 110° C. It is surprising that even the small addition of 1-2% calcium sulfate can realize a large energy saving over the process of the prior art. A large percentage of heating during milling can be overcome by the natural evaporative characteristics of the product of the invention. The temperature within the mill is maintained within the range of from about 90° C. to about 400° C. and preferably from about 90° C. to about 300° C. and more preferably from about 90° C. to about 110° C.

It has also been found that an improved calcium sulfate-treated potassium modified alkali metal aluminum phosphate granule can be prepared. This product is characterized by a considerable improvement in non-dusting properties and flow characteristics over SALP alone or with a flow conditioning agent without loss of baking performance. The potassium modified alkali metal phosphate is prepared by the controlled substitution of potassium ion for a portion of the sodium ion used in producing the sodium aluminum phosphate, as is disclosed in U.S. application Ser. No. 671,769 filed Mar. 30, 1976, the disclosure of which is incorporated herein by reference.

It appears that when controlled amounts of potassium ion are contacted with a mixture of sodium treated food grade phosphoric acid which is subsequently reacted with alumina trihydrate, ($Al_2O_3.3H_2O$), to produce sodium aluminum phosphate, changes in the crystal structure occur that appear to stabilize the crystal habit of the potassium modified sodium aluminum phosphate. This change in the crystal structure manifests itself in the form of a doublet pattern as shown by X-ray diffraction powder patterns. This doublet suggests that there may be direct substitution of potassium for some of the sodium within the alkali metal aluminum phosphate molecule.

In accordance with the present invention, an improved calcium sulfate-treated potassium modified sodium aluminum phosphate is produced by contacting a food grade phosphoric acid with a sufficient amount of potassium hydroxide to provide an analysis of about 0.5 to about 1.2, more preferably 0.6 to about 1.0 weight percent of potassium oxide ($K_2O$) in the potassium modified SALP. Other potassium containing compounds can also be utilized, such as $K_2CO_3$, $KHCO_3$, $K_3PO_4$ and the like, with the proviso that the anion attached to the potassium not contaminate the reaction media or product.

It appears that the $K_2O$ analysis is a critical factor in helping to achieve changes in crystal structure of the final product which contributes to good flow and dust properties of the product.

The potassium treated phosphoric acid is then contacted with a sufficient amount of sodium carbonate ($Na_2CO_3$) to provide an analysis of about 2.4 to about 3.2, preferably about 2.6 to about 3 weight percent of sodium oxide ($Na_2O$) in the potassium modified SALP. The normal process for preparing SALP as discussed hereinbefore is then followed.

As noted previously, good dust and flow characteristics of leavening acids such as the calcium sulfate treated SALP or potassium modified SALP are extremely important in plants which mix and package dry mixes for the preparation of baked products and the like, by using automatic feeders for metering the ingredients. It has been found during the course of removing a leavening acid from storage bins, intermittent flow sometimes occurs, and on some occasions, flow will completely cease. This cessation of flow is called "bridging". The problems of bridging can sometimes be ameliorated by the addition of flow control agents such as Cab-O-Sil TM (a form of $SiO_2$ sold by Cabot Chemical Company) or tricalcium phosphate, to the leavening acid. The drawbacks of the approach, however, are that these flow agents are expensive, sometimes unpredictable in the effect they will have on flow characteristics and, unfortunately, can also create dust problems of their own.

The calcium sulfate treated SALP's of the present invention have sufficiently improved flow and dust characteristics to overcome a majority of these problems.

It is also surprising that the addition of the calcium sulfate contributes to the maintainence of a clean reactor. Normally, a 24 hour shut-down is required to clean the build-up of solids on the walls and agitator of the SALP reactor after 21 to 28 days of production. It was surprisingly found that as little as 5% calcium sulfate when added to the reactor batch after crystallization and prior to drying dissolves all previous build-up. By the use of calcium sulfate in amounts ranging from about 0.5% to 20% in accordance with the invention, reactors can be kept cleaner and increased production can be attained. A greater effect is seen as the quantity of calcium sulfate is increased. The product drys rapidly and granulates easily. The rapid drying allows for a longer "wet zone" meaning product can be taken more often from the reactors and put in the dryers. An increase in production is thus obtainable. The product is less dusty and has decreased hygroscopicity and increased density. Plant handling is improved. Because of the decreased hygroscopicity, the product can be milled at lower temperatures without blinding the mill screens. Energy consumption is greatly reduced. The decreased dusting and increased density allows for easier packaging in smaller containers. Increased density of the product improves packaging operations. Bags and drums are easily filled with sufficient space remaining for quick and positive closure.

The compositions of the present invention are useful as leavening acids in such areas as biscuit mixes, pancake mixes, waffle mixes, cake mixes, doughnut mixes, muffin mixes, self-rising flour and the like. Various other materials can also be added to the compositions of the present invention to adjust rate such as mono-calcium phosphate.

The products of the present invention can be used in place of sodium aluminum phosphate leavening acids in those areas where sodium aluminum phosphate is presently used. The products of the present invention can also be blended with other ingredients normally blended with sodium aluminum phosphate such as sodium aluminum sulfate as per U.S. Pat. No. 3,041,177, the disclosure of which is hereby incorporated by reference. The products of the present invention can be formulated into baking powders and self-rising flour formulations which are well known in the art.

At higher levels of calcium sulfate, the products of the present invention may also be used in areas where the tolerance to the baking ingredients must be increased without sacrificing the quality of the finished baked good. This is particularly true in areas using lactylated shortenings such as cakes.

The invention will be illustrated in the Examples which follow.

EXAMPLE 1

In a suitable steam jacketed reactor equipped with agitation means was placed 3331 liters (880 gallons) of an acid blend of 3217 liters phosphoric acid α 86%, 262 kilograms sodium carbonate, and 115.5 liters liquid potassium hydroxide (45%) (amounts sufficient to provide 2.8% $Na_2O$ and 0.90% $K_2O$ based on the final weight of the SALP). The acid blend was heated by conducting steam into the jacket while agitating until 80° C. was reached (about 15 minutes). 1516.5 kilograms (3370 lbs.) of alumina was slowly added to the reactor while maintaining agitation. The alumina was added in two stages, the first portion of 597.5 kilograms (1328 lbs.) was added by hand over a period of 22 minutes at a rate of approximately 22 kilograms/minute (60 lbs./minute) and the second portion of 918.8 kilograms (2,042 lbs.) was added automatically over a 50 minute period at a rate of approximately 18 kilograms per minute (41 lbs. per minute). The addition was accomplished at such a rate that extensive boiling did not occur. The mixture was then allowed to react for approximately one hour at 110° C. The reactor was cooled to a temperature within the range of from 75° to 80° C. by replacing the steam in the jacket with cooling water. Calcium sulfate was then added to the reactor with agitation in 45 kilogram (100 lb.) portions until 495 kilograms (1100 lbs.) of anhydrous calcium sulfate was added. From 114 to 152 liters (30–40 gallons) of water was added to maintain the viscosity constant. The flow of cooling water was discontinued and the temperature rose to approximately 120° C. It was noted that the reactor scale of SALP from the previous 20 runs was dissolved leaving a clean reactor. After agitation for 30 minutes after the last of the calcium sulfate was added or a total agitation time from the initial addition of 60 minutes, the reactor batch was slug fed to a Kneadermaster dryer/granulator at approximately 58° C. The temperature in the wet zone was approximately 64° C., and 59° C. at discharge. The LOI on discharge is between 22 and 22.5. The retention time in the Kneadermaster was approximately 30-45 minutes.

After exiting the Kneadermaster, the product was milled under heated air (400° C.) to avoid moisture pickup and clogging of the screens. The temperature in the mill hot air unit was adjusted from the normal 400° C. to 300° C. and then 100° C. Milling continued to be satisfactory with no tendency to clog the screens. The product was then air classified by particle size, through 60 mesh being desirable for the final product. The product was then bagged.

A standard method for evaluating baking performance of a leavening acid is the baking powder rate of reaction test (BPRR). In this test, a baking powder is formulated comprising a leavening acid, sodium bicarbonate, starch and water. The purpose of the BPRR test is to observe and measure the rate of carbon dioxide discharge from the baking powder as a means of evaluating the suitability and quality of the leavening acid candidate as a baking acid.

Ideally, there should be a sufficient initial release of carbon dioxide in the baking mix to facilitate mixing and blending of the constituents. The mixture should also be capable of suppressing the release of carbon dioxide until such time as the mix is placed in an oven and heated, whereupon more carbon dioxide is released during baking. The BPRR test is conducted at a temperature of 27° C.±0.5° C. The leavening acid and sodium bicarbonate are used in proportions that are theoretically capable of liberating 200 cc of carbon dioxide. More details regarding reaction rate testing, as well as the apparatus required, are found in Cereal Chemistry, Volume 8, pages 423-433 (1933).

Three samples were prepared by the foregoing procedure. The products had the following analysis:

TABLE I

| Test | SALP/CaSO$_4$ | | |
|---|---|---|---|
| | Lot A | Lot B | Lot C |
| Seiving | | | |
| On 60 mesh - % | 1.1 | 0.9 | 0.5 |
| On 100 mesh - % | 9.3 | 8.2 | 4.3 |
| On 140 mesh - % | 17.9 | 16.8 | 8.0 |
| On 200 mesh - % | 20.6 | 17.6 | 11.3 |
| Through 200 mesh | 51.1 | 56.5 | 75.9 |
| SO$_3$ - % | 2.8 | 2.9 | 4.2 |
| P$_2$O$_5$ - % | 56.8 | 57.0 | 55.4 |
| Al$_2$O$_3$ - % | 15.5 | 15.4 | 14.8 |
| Na$_2$O - % | 2.6 | 2.6 | 2.5 |
| K$_2$O - % | 0.78 | 0.86 | 0.85 |
| CaO - % | 2.2 | 2.1 | 3.6 |
| L.O.I. - % | 21.9 | 21.9 | 22.7 |
| (Includes SO$_3$) | | | |
| BPRR | | | |
| 2 minutes (cc) | 51 | 52 | 53 |
| 4 minutes (cc) | 68 | 68 | 69 |
| 10 minutes (cc) | 92 | 91 | 89 |
| Neutralizing Value (FCC Method) | 104 | 103.8 | 101.8 |
| Density (Composite of Lot A, B & C) | | | |
| Loose | 3.31 Kg/cc | (53 Lb/ft$^3$) | |
| Packed | 5.57 Kg/cc | (86 Lb/ft$^3$) | |
| Free Acid (Composite of Lots A, B & C) 0.29% | | | |

The three lots prepared in accordance with Example 1 were found to be effective as leavening in cakes containin lactylated shortening by blending the product with 6.5% aluminum sulfate added to the total combined weight of the SALP/CaSO$_4$ in accordance with the procedure of U.S. Pat. No. 3,041,177.

A white cake was prepared by sifting together 228 grams cake flour, 18 grams non fat dried milk, 4.2 grams salt, 4.8 grams granulated sodium bicarbonnate, 12 grams gelantinized starch, 9 grams corn sugar (dextrose), 256 grams powdered sugar and 6 grams of a leavening agent as identified in Table II below. 67 grams of an emulsified shortening (D-21 from Durkee Foods described as hydrogenated vegetable oil shortening with glyceryllactoesters of fatty acids and lecithin emulsifier added) was blended into the dry mix in a Hobart mixer at speed 1 for five minutes. The blend was put through a cake finisher twice.

570 grams of the mix was scaled into a bowl. 1¼ cups of water and two egg whites were blended in a home type mixer on low speed. The bowl was scraped and mixing continued for four minutes at medium speed. The batter was divided equally into two 20.32 centimeter (eight inch) cake pans, about 440 grams per pan. The cakes were baked at 176.6° C. (350° F.) for 30 minutes.

The following results were obtained:

| Leavening Agent | Cake Weight | Cake Vol. | Av. Specif. Vol. | pH | Comments |
|---|---|---|---|---|---|
| Example 1, Lot A | 401 | 1250 | 3.105 | 7.20 | Slightly coarse grain |
| 6.5% Al$_2$(SO$_4$)$_3$ | 400 | 1235 | — | | No tunnels |
| Example 1, Lot A | 402 | 1250 | 3.10 | 7.19 | Slightly coarse grain |
| 6.5% Al$_2$(SO$_4$)$_3$ | 401 | 1240 | | | No tunnels |
| Example 1, Lot C | 401 | 1260 | 3.12 | 7.23 | Slightly coarse grain |
| 6.5% Al$_2$(SO$_4$)$_3$ | 400 | 1240 | | | No tunnels |
| Example 1, Lot C | 404 | 1250 | 3.08 | 7.40 | Coarse Grain |
| | 403 | 1240 | | | Tunnels |
| SALP/Al$_2$(SO$_4$)$_3$* | 403 | 1250 | Val. | 7.14 | Fine Grain |
| | 400 | 1225 | 3.08 | | No tunnels |

*B1-60 - Stauffer Chemical Company

EXAMPLE 2

4387.5 grams (9.75 lbs.) of reactor slurry of SALP prepared in accordance with the procedure of Example 1 up to the point after adding the alumina and allowing the mixture to react for 1 hour at 110° C. and prior to the calcium sulfate addition was blended with 310 grams of anhydrous calcium sulfate in a tub shaped covered jacketed mixer having two contrarotating arms with downwardly dependant mixing blades. The cover was provided with an ingredient inlet and a steam outlet. The temperature at the time of addition was approximately 80° C. The temperature was elevated to approximately 90° C. as agitation was begun. Agitation was continued until the product was dried and granulated, approximately ¾ hour. The temperature during drying ranged from about 90° C. to about 100° C.

The material while drying went from a smooth slurry to a solid friable product. The product was more friable than a SALP produced without calcium sulfate. The product was easily removed from the reactor and large lumps crumbled easily.

The granulated product was easily milled in a laboratory hammer mill with a screen having 1.59 mm (1/16 inch) openings. The product had good flow and excellent dustiness characteristics. By microscopic examination, the product has a large number of well formed 1-3-8 hexagonal crystals.

The calcium sulfate treated potassium modified SALP as prepared in accordance with the present example containing 9.1% calcium sulfate anhydrous was analyzed by X-ray diffraction powder patterns, infrared spectroscopy and electron probe microanalysis. This was compared to a physical blend of potassium modified SALP and 7.8% calcium sulfate anhydrous.

Both X-ray diffraction powder patterns and infrared spectroscopy show no difference between the product of the invention and the dry blend.

In the electron probe analysis of the dry blend, the X-ray maps for calcium and sulfur overlap each other but not the maps for aluminum and phosphorus.

In the electron probe analysis of the product of the present invention, the calcium and sulfur images overlap the aluminum and phosphorus images. This is interpreted as showing that the calcium sulfate in the product of the present invention is not present as separate particles but is found as a compound in the same place as the SALP. The calcium sulfate may be present as a surface coating or possibly as ultrafine calcium sulfate crystallites on the surface of the SALP. The baking powder rate of release test given hereinbefore was performed on milled and unmilled product of this example. The results are reported in Table III as follows.

TABLE III

| Baking Powder Rate of Reaction Test (c.c. of evolved $CO_2$) | | | | | |
|---|---|---|---|---|---|
| | 2 min. | 4 min. | 10 min. | 15 min. | 20 min. |
| Before milling | | | | | |
| Through 60 mesh | 31 | 45 | 67 | 83 | 93 |
| Milled | 41 | 56 | 81 | 92 | 99 |
| Milled | | | | | |
| Through 60 mesh | 50 | 64 | 85 | 95 | 101 |

EXAMPLE 3

The process of Example 1 was repeated using approximately 67.5 kilograms (150 lbs.) calcium sulfate or approximately 1-2% $CaSO_4$ based on the weight of a reactor charge of between about 5850 Kg to about 6300 kg (13,000 lb.-14,000 lbs). The reactor was operated for approximately one week at the 1-2% calcium sulfate additional level. A cleaner reactor along with a product having good handling characteristics was obtained. The mill hot air temperature was reduced from 380° C. to 280° C. with no change in the physical properties of the product. The production rate was increased by 7% during this period.

Two products were analyzed, the first being the SALP/$CaSO_4$ product alone and the second being the SALP/$CaSO_4$ product blended with 6.5% aluminum sulfate based on total weight of the SALP/$CaSO_4$ blend added during drying.

The following results were obtained:

TABLE IV

| Test | SALP/$CaSO_4$ | SALP/$CaSO_4$/$Al_2(SO_4)_3$ |
|---|---|---|
| Sieving | | |
| On 60 mesh - % | 0.4 | 0.5 |
| On 100 mesh - % | 4.9 | 5.2 |
| On 140 mesh - % | 12.4 | 12.6 |
| Through 140 mesh - % | 82.3 | 81.7 |
| Flow | Satisfactory | Satisfactory |
| BPRR | | |
| 2 minute (cc) | 46 | 56 |

TABLE IV-continued

| Test | SALP/$CaSO_4$ | SALP/$CaSO_4$/$Al_2(SO_4)_3$ |
|---|---|---|
| 4 minute (cc) | 64 | 75 |
| 10 minute (cc) | 92 | 104 |
| Neutralizing Value (FCC Method) | 101.5 | 101.4 |
| Free acid % | 0.20 | 0.25 |
| $SO_3$ - % | 0.90 | 4.65 |
| $P_2O_5$ - % | 58.65 | 55.85 |
| $Al_2O_3$ - % | 16.18 | 16.66 |
| $Na_2O$ - % | 2.60 | 2.40 |
| $K_2O$ - % | 0.79 | 0.75 |
| CaO - % | 1.32 | 1.07 |
| L.O.I. - % | 20.81 | 23.44 |

Self-rising flour biscuits were prepared using the products of the present invention.

| Sodium Bicarbonate | 3.3 gms | |
| Leavening Acid | See Table VIII | Self-rising |
| Salt | 5.4 | Flour mixture |
| Flour | 240 gms. | |
| Shortening | 32 gms. | |
| Milk | 165-170 cc. | |

The amount of leavening acid required can be determined by its neutralizing value. Its neutralizing value is a measurement of the parts by weight of sodium bicarbonate which will be neutralized by exactly 100 parts by weight of a given leavening acid. The amount of leavening acid required is obtained by multiplying the amount of sodium bicarbonate used (in this case 3.3 gms) by 100 and dividing the result by the neutralizing value of the leavening acid. This amount was added to the self-rising flour formulation. Biscuit were baked under controlled conditions as follows:

(1) Heat electric oven to 340° F.;
(2) Weigh out self-rising flour, shortening and milk;
(3) Cut shortening into self-rising flour in Hobart blender for 1½ minutes until mix is fine and crumbly;
(4) Roll on cloth covered board with ½" gauge rails using dusting flour and cloth covered rolling pin;
(5) Cut dough with 2 inch cutter and bake 18 minutes at 450° F.

Biscuit bake tests and evaluation of the results therefrom is explained in Cereal Laboratory Methods, 6th Ed., American Association of Cereal Chemists, 1957 pp. 46-48. The results of the biscuit bakes including the amount of leavening acid used are reported in Table III. The biscuit weight is the weight of 7 biscuits just after baking. The six most evenly sloped biscuits are then measured to provide biscuit height in inches. The volume is the number of cc's of rape seed displaced by six biscuits. The specific volume is obtained by dividing the volume by biscuit weight. Amount of acid used, dough weight and biscuit weight are in grams.

Three sets of experiments were run comparing the product of Example 3 to a standard SALP leavening acid (Levair, Stauffer Chemical Company). Also the product of Example 3 blended with approximately 34% monocalcium phosphate or approximately 6.5% aluminum sulfate and compared to similar commercial products activ-8 and Bl-60 (Stauffer) respectively prepared with a SALP not containing calcium sulfate.

The following results were obtained.

TABLE V

| Sample | Dough Weight | Biscuit Weight | Height | Volume | Specific Volume | pH |
|---|---|---|---|---|---|---|
| Prod. Ex. 3 SALP/1-2%/CaSO₄ | 230 | 202 | 9¼ | 580 | 2.87 | 6.87 |
| SALP* | 234 | 209 | 9¼ | 590 | 2.82 | 6.96 |
| Prod. Ex. 3 SALP/1-2%/CaSO₄ 33% monocalcium phosphate | 234 | 209 | 9¼ | 605 | 2.89 | 6.96 |
| SALP/33% monocalcium phosphate** | 233 | 206 | 9¼ | 580 | 2.81 | 7.00 |
| Prod. Ex. 3 SALP/1-2%/CaSO₄ 65% Al₂(SO₄)₃ | 232 | 204 | 9¼ | 600 | 2.94 | 6.68 |
| SALP/6.5% Al₂(SO₄)₃*** | 232 | 206 | 9¼ | 595 | 2.88 | 6.74 |

*Levair ® - Stauffer Chemical Company - Control
**Actif-8 ® Stauffer Chemical Company - Control
***BL-60 ® Stauffer Chemical Company - Control The product of this example can also be effectively used to leaven pancakes. Results equivalent to a control using a commercial SALP (LEVAIR—Stauffer Chemical Company) were obtained.

What is claimed is:

1. In a process for the preparation of an alkali metal aluminum phosphate which comprises:
   (a) contacting a food grade phosphoric acid having a concentration of about 70.0 to about 90.0 weight percent $H_3PO_4$ with a sufficient amount of an alkali metal ion selected from the group consisting of sodium, potassium and mixtures thereof and aluminum ion to form an alkali metal aluminum phosphate in a slurry; and
   (b) drying the alkali metal aluminum phosphate; the improvement which comprises:
      (1) contacting said alkali metal aluminum phosphate slurry with calcium sulfate subsequent to the initial formation of the alkali metal aluminum phosphate slurry in step (a) and prior to the completion of the drying in step (b).

2. The process as recited in claim 1 wherein said calcium sulfate is added in an amount ranging from about 0.5% to about 20% of calcium sulfate on a dry solids basis based on the total weight of the alkali metal aluminum phosphate and the calcium sulfate.

3. The process as recited in claim 2 wherein calcium sulfate is used in an amount ranging from about 1% to about 10%.

4. The process as recited in claim 1 wherein the product is granulated while drying under such conditions that a majority of the granulated particles when dried are less than about 840 microns, and at least 90% are less than 2000 microns.

5. The process as recited in claim 1 wherein said alkali metal ion is sodium ion.

6. The process as recited in claim 1 wherein the free acid content of the slurry prior to calcium sulfate addition is less than 1% by weight based on the total weight of the dried product.

7. The process as recited in claim 1 wherein said sodium ion is provided by a compound selected from the group consisting of sodium carbonate, sodium hydroxide, sodium bicarbonate and sodium phosphate and mixtures thereof.

8. The process as recited in claim 1 wherein the ratio of alkali metal: aluminum: $PO_4$ in the final product is about 1:3:8.

9. In a process for the preparation of a potassium modified sodium aluminum phosphate which comprises:
   (a) contacting a food grade phosphoric acid having a concentration of about 70.0 to about 90.0 weight percent $H_3PO_4$ with a sufficient amount of potassium ion and a sufficient amount of sodium ion to provide a sodium/potassium treated phosphoric acid;
   (b) contacting the sodium-potassium treated phosphoric acid with an aluminum compound to form a potassium modified sodium aluminum phosphate crystalline slurry; and
   (c) drying the potassium modified sodium aluminum phosphate; the improvement which comprises:
      (1) contacting said potassium modified sodium aluminum phosphate slurry with calcium sulfate subsequent to the initial formation of potassium modified sodium aluminum phosphate in the slurry in step (b) and prior to the completion of the drying in step (c).

10. The process as recited in claim 9 wherein said calcium sulfate is added in an amount ranging from about 0.5% to about 20% of calcium sulfate on a dry solids basis based on the total weight of the alkali metal aluminum phosphate and the calcium sulfate.

11. The process as recited in claim 10 wherein calcium sulfate is used in an amount ranging from about 1% to about 10%.

12. The process as recited in claim 9 wherein the product is granulated while drying under such conditions that a majority of the dried granulated particles are less than about 840 microns, and at least 90% are less than 2000 microns.

13. The process as recited in claim 9 wherein said potassium ion is provided by a compound selected from the group consisting of potassium hydroxide, potassium carbonate, and potassium phosphate and mixtures thereof.

14. The process as recited in claim 9 wherein said sodium ion is provided by a compound selected from the group consisting of sodium carbonate, sodium hydroxide, sodium bicarbonate and sodium phosphate and mixtures thereof.

15. The process as recited in claim 9 wherein the free acid content of the slurry prior to calcium sulfate addition is less than 1% by weight based on the total weight of the dried product.

16. The process as recited in claim 9 wherein the ratio of Na+K:Al:$PO_4$ in the final product is about 1:3:8.

17. A process for preparing an alkali metal aluminum phosphate which comprises contacting a slurry of alkali metal aluminum phosphate having a free acid content of less than 1% by weight based on the weight of the alkali metal aluminum phosphate with calcium sulfate in an amount ranging from about 0.5% to about 20% by weight based on the total weight of the alkali metal aluminum phosphate and the calcium sulfate followed by granulating while drying the slurry under such conditions that a majority of the granulated particles when dried are less than 840 microns and at least 90% are less than 2,000 microns.

* * * * *

UNITED STATES PATENT AND TRADEMARK OFFICE
CERTIFICATE OF CORRECTION

PATENT NO. : 4,260,591
DATED : April 7, 1981
INVENTOR(S) : Robert E. Benjamin
Thomas E. Edging It is certified that error appears in the above—identified patent and that said Letters Patent is hereby corrected as shown below:

Col. 2, line 10 - change "hygropscopity" to "hygroscopity".

Col. 4, line 1 - change "bind" to "blind".

Col. 4, line 56 - change "mixture" to "mixing".

Col. 4, line 59 - change "trihyrate" to "trihydrate".

Col. 10, line 1 - change "containin" to "containing".

Col. 10, line 7 - change "bicarbonnate" to "bicarbonate".

Col. 10, line 8 - change "gelantinized" to "gelatinized".

Col. 11, line 47 - change "additional" to "addition".

Col. 12, line 51 - change "Table III" to "Table V".

Signed and Sealed this

Fifteenth Day of September 1981

[SEAL]

Attest:

Attesting Officer

GERALD J. MOSSINGHOFF

Commissioner of Patents and Trademarks